United States Patent
Naidu et al.

(10) Patent No.: US 6,871,553 B2
(45) Date of Patent: Mar. 29, 2005

(54) INTEGRATING FLUXGATE FOR MAGNETOSTRICTIVE TORQUE SENSORS

(75) Inventors: Malakondaiah Naidu, Troy, MI (US); Joseph Pierre Heremans, Troy, MI (US); Thomas Wolfgang Nehl, Shelby Township, MI (US); John R. Smith, Birmingham, MI (US); Brian K Fuller, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 88 days.

(21) Appl. No.: 10/402,620

(22) Filed: Mar. 28, 2003

(65) Prior Publication Data

US 2004/0187605 A1 Sep. 30, 2004

(51) Int. Cl.$^7$ ................................................. G01L 3/02
(52) U.S. Cl. ............... 73/862.331; 73/862; 73/862.321; 73/862.339
(58) Field of Search .............. 73/862, 862.321–862.339

(56) References Cited

U.S. PATENT DOCUMENTS

| | | | |
|---|---|---|---|
| 2,861,900 A | 11/1958 | Smith et al. | |
| 3,100,724 A | 8/1963 | Rocheville | 118/308 |
| 3,876,456 A | 4/1975 | Ford et al. | |
| 3,993,411 A | 11/1976 | Babcock et al. | 403/271 |
| 3,996,398 A | 12/1976 | Manfredi | |
| 4,263,335 A | 4/1981 | Wagner et al. | 427/29 |
| 4,416,421 A | 11/1983 | Browning et al. | |
| 4,606,495 A | 8/1986 | Stewart, Jr. et al. | 228/183 |
| 4,627,298 A | * 12/1986 | Sahashi et al. | 73/862.336 |
| 4,651,573 A | * 3/1987 | Himmelstein et al. | 73/862.333 |
| 4,891,275 A | 1/1990 | Knoll | 428/650 |
| 4,939,022 A | 7/1990 | Palanisamy | 428/209 |

(Continued)

FOREIGN PATENT DOCUMENTS

| | | | |
|---|---|---|---|
| DE | 42 36 911 | 12/1993 | |
| DE | 199 59 515 | 6/2001 | |
| DE | 100 37 212 | 1/2002 | |
| DE | 101 26 100 | 12/2002 | |
| EP | 1 160 348 | 12/2001 | |
| EP | 1245854 A2 | 2/2002 | |
| EP | 1245854 A2 | 10/2002 | ............ F16F/9/348 |
| JP | 55031161 | 3/1980 | |
| JP | 61249541 | 11/1986 | |
| JP | 04180770 | 6/1992 | |
| JP | 04243524 | 8/1992 | |
| WO | 98/22639 | 5/1998 | |
| WO | 02/052064 | 1/2002 | |
| WO | 03009934 | 2/2003 | |

OTHER PUBLICATIONS

Hoton How, et al. *Development of High–Sensitivy Fluxgate Magnetometer Using Single–Crystal Yttrium–Iron Garnet Thick Film as the Core Material, ElectroMagnetic Applications, Inc.*

Ripka, et al., *Microfluxgate Sensor with Closed Core*, submitted for Sensors and Actuators, Version 1, Jun. 17, 2000.

(Continued)

Primary Examiner—Edward Lefkowitz
Assistant Examiner—Alandra Ellington
(74) Attorney, Agent, or Firm—Scott A. McBain

(57) ABSTRACT

A torque sensing apparatus for picking up a magnetic field of a magnetostrictive material disposed on a shaft, the torque sensing apparatus having: a first integrating ring; a second integrating ring; a first fluxgate return strip and a second fluxgate return strip each being connected to the first integrating ring at one end and the second integrating ring at the other end; an excitation coil; and a feedback coil; wherein the first integrating ring and the second integrating ring are configured to be positioned to pick up flux signals along the entire periphery of the ends of the magnetostrictive material.

25 Claims, 8 Drawing Sheets

U.S. PATENT DOCUMENTS

| | | | |
|---|---|---|---|
| 5,187,021 A | 2/1993 | Vydra et al. | 428/607 |
| 5,217,746 A | 6/1993 | Lenling et al. | |
| 5,271,965 A | 12/1993 | Browning | 427/446 |
| 5,302,414 A | 4/1994 | Alknimor | 427/192 |
| 5,308,463 A | 5/1994 | Hoffmann et al. | |
| 5,328,751 A | 7/1994 | Komorita et al. | |
| 5,340,015 A | 8/1994 | Hira et al. | 228/205 |
| 5,362,523 A | 11/1994 | Gorynin et al. | |
| 5,395,679 A | 3/1995 | Myers et al. | 428/209 |
| 5,424,101 A | 6/1995 | Atkins et al. | 427/448 |
| 5,464,146 A | 11/1995 | Zalvzec et al. | 228/208 |
| 5,465,627 A | 11/1995 | Garshelis | |
| 5,476,725 A | 12/1995 | Papich et al. | 428/654 |
| 5,493,921 A | 2/1996 | Alasafi | |
| 5,520,059 A | 5/1996 | Garshelis | |
| 5,525,570 A | 6/1996 | Chakraborty et al. | |
| 5,527,627 A | 6/1996 | Lautzenhiser et al. | 428/615 |
| 5,585,574 A | 12/1996 | Sugihara et al. | 73/862 |
| 5,593,740 A | 1/1997 | Strumban et al. | 427/577 |
| 5,648,123 A | 7/1997 | Kuhn et al. | |
| 5,683,615 A | 11/1997 | Munoz | 252/62 |
| 5,706,572 A | 1/1998 | Garshelis | |
| 5,708,216 A | 1/1998 | Garshelis | |
| 5,725,023 A | 3/1998 | Padula | |
| 5,795,626 A | 8/1998 | Gabel et al. | 427/458 |
| 5,854,966 A | 12/1998 | Kampe et al. | 419/67 |
| 5,875,626 A | 3/1999 | Cromartie | 57/1 |
| 5,887,335 A | 3/1999 | Garshells | 29/602 |
| 5,889,215 A | 3/1999 | Kilmartin et al. | 73/862 |
| 5,894,054 A | 4/1999 | Poruchuri et al. | 428/642 |
| 5,907,105 A | 5/1999 | Pinkerton | |
| 5,907,761 A | 5/1999 | Tohma et al. | 428/553 |
| 5,952,056 A | 9/1999 | Jordan et al. | 427/455 |
| 5,965,193 A | 10/1999 | Ning et al. | |
| 5,989,310 A | 11/1999 | Chu et al. | 75/685 |
| 5,993,565 A | 11/1999 | Pinkerton | |
| 6,033,622 A | 3/2000 | Maruyama | 419/35 |
| 6,047,605 A | 4/2000 | Garshelis | |
| 6,051,045 A | 4/2000 | Narula et al. | 75/233 |
| 6,051,277 A | 4/2000 | Claussen et al. | 427/376 |
| 6,074,737 A | 6/2000 | Jordan et al. | 428/312 |
| 6,098,741 A | 8/2000 | Gluf et al. | |
| 6,119,667 A | 9/2000 | Boyer et al. | 123/634 |
| 6,129,948 A | 10/2000 | Plummet et al. | 427/202 |
| 6,139,913 A | 10/2000 | Van Steenkiste et al. | 427/191 |
| 6,145,387 A | 11/2000 | Garshelis | |
| 6,149,736 A | 11/2000 | Sukigara et al. | 148/301 |
| 6,159,430 A | 12/2000 | Foster | |
| 6,189,663 B1 | 2/2001 | Smith et al. | 188/322 |
| 6,260,423 B1 | 7/2001 | Garshelis | |
| 6,261,703 B1 | 7/2001 | Sasaki et al. | |
| 6,283,386 B1 | 9/2001 | Van Steenkiste et al. | 239/427 |
| 6,283,859 B1 | 9/2001 | Carlson et al. | 463/36 |
| 6,289,748 B1 | 9/2001 | Lin et al. | 73/862 |
| 6,330,833 B1 * | 12/2001 | Opie et al. | 73/862.333 |
| 6,338,827 B1 | 1/2002 | Nelson et al. | |
| 6,344,237 B1 | 2/2002 | Kilmer et al. | |
| 6,374,664 B1 | 4/2002 | Bauer | |
| 6,402,050 B1 | 6/2002 | Kashirin et al. | |
| 6,422,360 B1 | 7/2002 | Oliver et al. | |
| 6,424,896 B1 | 7/2002 | Lin | |
| 6,446,857 B1 | 9/2002 | Kent et al. | |
| 6,465,039 B1 | 10/2002 | Pinkerton et al. | |
| 6,485,852 B1 | 11/2002 | Miller et al. | |
| 6,488,115 B1 | 12/2002 | Ozsoylu | |
| 6,490,934 B2 | 12/2002 | Garshelis | |
| 6,511,135 B2 | 1/2003 | Ballinger et al. | |
| 6,537,507 B2 | 3/2003 | Nelson et al. | |
| 6,551,734 B1 | 4/2003 | Simpkins et al. | |
| 6,553,847 B2 | 4/2003 | Garshelis | |
| 6,615,488 B2 | 9/2003 | Anders | |
| 6,623,704 B1 | 9/2003 | Roth | |
| 6,623,796 B1 | 9/2003 | Van Steenkiste et al. | |
| 6,624,113 B2 | 9/2003 | LaBarge et al. | |
| 2002/0071906 A1 | 6/2002 | Rusch | |
| 2002/0073982 A1 | 6/2002 | Shaikh et al. | |
| 2002/0102360 A1 | 8/2002 | Subramanian et al. | |
| 2002/0110682 A1 | 8/2002 | Brogan | |
| 2002/0112549 A1 | 8/2002 | Cheshmehdoost et al. | 73/862 |
| 2002/0182311 A1 | 12/2002 | Leonardi et al. | |
| 2003/0039856 A1 | 2/2003 | Gillispie et al. | |
| 2003/0190414 A1 | 10/2003 | VanSteenkiste | |
| 2003/0219542 A1 | 11/2003 | Ewasyshyn et al. | |

OTHER PUBLICATIONS

Henriksen, et al., *Digital Detection and Feedback Fluxgate Magnetometer*, Meas. Sci. Technol. 7 (1996) pp. 897–903.

Cetek 930580 Compass Sensor, *Specifications*, Jun. 1997.

Geyger, *Basic Principles Characteristics and Applications, Magnetic Amplifier Circuits*, 1954, pp. 219–232.

Pavel Ripka, et al., *Pulse Excitation of Micro–Fluxgate Sensors*, IEEE Transactions on Magnetics, vol. 37, No. 4, Jul. 2001, pp. 1998–2000.

Trifon M. Liakopoulos, et al., *Ultrahigh Resolution DC Magnetic Field Measurements Using Microfabricated Fluxgate Sensor Chips*, University of Cincinnati, Ohio, Center for Microelectronic Sensors and MEMS, Dept. of ECECS pp. 630–631.

Derac Son, *A New Type of Fluxgate Magnetometer Using Apparent Coericive Field Strength Measurement*, IEEE Transactions on Magnetics, vol. 25, No. 5, Sep. 1989, pp. 3420–3422.

O. Dezuari et al., *Printed Circuit Board Integrated Fluxgate Sensor*, Elsevier Science S.A. (2000) Sensors and Actuators, pp. 200–203.

How, et al., *Generation of High–Order Harmonics in Insulator Magentic Fluxgate Sensor Cores*, IEEE Transactions on Magnetics, vol. 37, No. 4, Jul. 2001, pp. 2448–2450.

Moreland, *Fluxgate Magnetometer*, Carl W. Moreland, 199–2000, pp. 1–9.

Ripka, et al., *Symmetrical Core Improves Micro–Fluxgate Sensors*, Sensors and Actuators, Version 1, Aug. 25, 2000, pp. 1–9.

I.J. Garshelis et al; *A Magnetoelastic Torque Transducer Utilizing a Ring Divided into Two Oppositely Polarized Circuferential Regions*; MMM 1995; Paper No. BB–08.

I.J. Garshelis et al; *Development of a Non–Contact Torque Transducer for Electric Power Steering Systems*; SAE Paper No. 920707; 1992; pp. 173–182.

Boley et al.; *The Effects of Heat Treatment on the Magnetic Behavior of Ring–Type Magnetoelastic Torque Sensors*; Proceedings of Sicon '01; Nov. 2001.

J.E. Snyder, et al., *Low Coercivity Magnetostrictive Material with Giant Piezomagnetic d33*, Abstract Submitted for the MAR99 Meeting of The American Physical Society.

*LEC Manufacturing and Engineering Capabilities*; Lanxide Electronic Components, Inc.

Dykhuizen et al: *Gas Dynamic Principles of Cold Spray*: Journal of Thermal Spray Technology; 06–98: pp. 205–212.

McCune et al; *An Exploration of the Cold Gas–Dynamic Spray Method For Several Materials Systems*.

Ibrahim et al: *Particulate Reinforced Metal Matrix Composites—A Review*; Journal of Matrials Science 26; pp. 1137–1156.

Stoner et al; *Measurements of the Kapitza Conductance between Diamond and Several Metals;* Physical Review Letters, vol. 68, No. 10; pp. 1563–1566.

Stoner et al; *Kapitza conductance and heat flow between solids at temperatures from 50 to 300K;* Physical Review B, vol. 48, No. 22, Dec. 1, 1993–II; pp. 16374;16387.

Johnson et al; *Diamond/Al metal matrix composites formed by the pressureless metal infiltration process;* J. Mater, Res., vol. 8, No. 5, May 1993; pp. 11691173.

Rajan et al; *Reinforcement coatings and interfaces in Aluminium Metal Matrix Composites:* pp. 3491–3503.

Alkhimov, et al; *A Method of "Cold" Gas–Dynamic Deposition;* Sov. Phys. Kokl. 36(12; Dec. 1990, pp. 1047–1049.

Dykuizen, et al; *Impact of High Velocity Cold Spray Particles:* in Journal of Thermal Spray Technology 8(4); 1999; pp. 559–564.

Swartz, et al; *Thermal Resistance At Interfaces; Appl. Phys. Lett.,* vol. 51, No. 26, 28; Dec. 1987; pp. 2201–2202.

Davis, et al; *Thermal Conductivity of Metal–Matrix Composlites; J.Appl. Phys.* 77(10), May 15, 1995; pp. 4494–4960.

Van Steenkiste, et al; *Kinetic Spray Coatings;* in Surface & Coatings Technology III; 1999; pp 62–71.

Liu, et al; *Recent Development in the Fabrication of Metal Matrix–Particulate Composites Using Powder Metallurgy Techniques:* in Journal of Material Science 29; 1994, pp. 1999–2007; National University of Singapore, Japan.

Papyrin; *The Cold Gas–Dynamic Spraying Method a New Method for Coatings Deposition Promises a New Generation of Technologies;* Novosibirsk, Russia.

McCune, al; Characterization of Copper and Steel Coatings Made by the Cold Gas–Dynamic Spray Method; National Thermal Spray Conference.

European Search Report dated Jan. 29, 2004 and it's Annex.

* cited by examiner

INTEGRATING FLUXGATE FOR MAGNETOSTRICTIVE TORQUE SENSORS

TECHNICAL FIELD

This disclosure relates to torque sensing apparatus and, in particular, an apparatus and method for sensing the torque applied to a rotating shaft.

BACKGROUND

In systems having rotating drive shafts it is sometimes necessary to know the torque and speed of these shafts in order to control the same or other devices associated with the rotatable shafts. Accordingly, it is desirable to sense and measure the torque applied to these items in an accurate, reliable and inexpensive manner.

Sensors to measure the torque imposed on rotating shafts, such as but not limited to shafts in vehicles, are used in many applications. For example, it might be desirable to measure the torque on rotating shafts in a vehicle's transmission, or in a vehicle's engine (e.g., the crankshaft), or in a vehicle's automatic braking system (ABS) for a variety of purposes known in the art.

One application of this type of torque measurement is in electric power steering systems wherein an electric motor is driven in response to the operation and/or manipulation of a vehicle steering wheel. The system then interprets the amount of torque or rotation applied to the steering wheel and its attached shaft in order to translate the information into an appropriate command for an operating means of the steerable wheels of the vehicle.

Prior methods for obtaining torque measurement in such systems was accomplished through the use of contact-type sensors directly attached to the shaft being rotated. For example, one such type of sensor is a "strain gauge" type torque detection apparatus, in which one or more strain gauges are directly attached to the outer peripheral surface of the shaft and the applied torque is measured by detecting a change in resistance, which is caused by applied strain and is measured by a bridge circuit or other well-known means.

Another type of sensor used is a non-contact torque sensor wherein magnetostrictive materials are disposed on rotating shafts and sensors are positioned to detect the presence of an external flux which is the result of a torque being applied to the magnetostrictive material.

Such magnetostrictive materials require an internal magnetic field which is typically produced or provided by either pre-stressing the magnetostrictive material by using applied forces (e.g., compressive or tensile) in either a clockwise or counter clockwise to pre-stress the coating prior to magnetization of the prestressed coating in order to provide the desired magnetic field. Alternatively, an external magnet or magnets are provided to produce the same or a similar result to the magnetostrictive material.

To this end, magnetostrictive torque sensors have been provided wherein a sensor is positioned in a surrounding relationship with a rotating shaft, with an air gap being established between the sensor and shaft to allow the shaft to rotate without rubbing against the sensor. A magnetic field is generated in the sensor by passing electric current through an excitation coil of the sensor. This magnetic field permeates the shaft and returns back to a pick-up coil of the sensor. The output of the pick-up coil is an electrical signal that depends on the total magnetic reluctance in the above-described loop. Part of the total magnetic reluctance is established by the air gap, and part is established by the shaft itself, with the magnetic reluctance of the shaft changing as a function of torque on the shaft. Thus, changes in the output of the pick-up coil can be correlated to the torque experienced by the shaft.

As understood herein, the air gap, heretofore necessary to permit relative motion between the shaft and sensor, nonetheless undesirably reduces the sensitivity of conventional magnetostrictive torque sensors. As further understood herein, it is possible to eliminate the air gap between a shaft and a magnetostrictive torque sensor, thereby increasing the sensitivity of the sensor vis-a-vis conventional sensors. Moreover, the present disclosure recognizes that a phenomenon known in the art as "shaft run-out" can adversely effect conventional magnetostrictive torque sensors, and that a system can be provided that is relatively immune to the effects of shaft run-out.

SUMMARY

It is an object of the present disclosure to provide a torque sensor that is sufficiently compact for use in applications where space is at a premium, such as in automotive applications.

A torque sensing apparatus for picking up a magnetic field of a circumferentially magnetized magnetostrictive material disposed on a shaft, comprising: a first integrating ring; a second integrating ring; a first fluxgate return strip and a second fluxgate return strip each being connected to the first integrating ring at one end and the second integrating ring at the other end; an excitation coil comprising a first coil wound about the first fluxgate return strip and a second coil wound about the second fluxgate return strip wherein the first and second coils of the excitation coil are connected in series so that the net excitation flux circulates between the flux gate strips via a first integrating ring and a second integrating ring; and a feedback coil wound about the first fluxgate return strip and the second fluxgate return strip, wherein the first integrating ring and the second integrating ring are configured to be positioned to pick up flux signals along the entire periphery of the ends of the magnetostrictive material.

A method for determining the applied torque to a shaft, comprising: collecting flux a first end of a magnetostrictive material disposed on the shaft via a first integrating ring; collecting flux at a second end of the magnetostrictive material disposed on the shaft via a second integrating ring; providing a measurement flux in a first flux gate winding and a second flux gate winding positioned about said magnetostrictive material; providing a low reluctance closed loop flux path from the first flux gate winding to the second flux gate winding; and measuring an applied torque to the shaft by using a null detection scheme on the low reluctance closed loop flux path.

DETAILED DESCRIPTION

Figure 1:
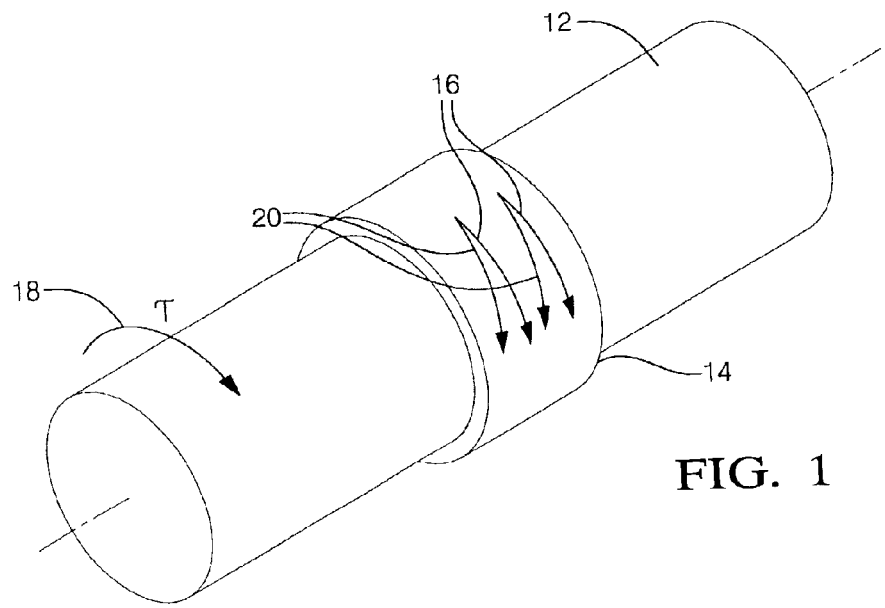
FIG. 1 is a perspective view of a magnetostrictive material disposed on a shaft.

Referring now to FIGS. 1–18 exemplary embodiments of a torque sensing apparatus 10 are illustrated. In an exemplary embodiment and referring in particular to FIG. 1, the torque-subjected member is in the form of a cylindrical shaft 12. However, the present disclosure is not intended to be limited to the specific configurations illustrated in FIG. 1. The shaft comprises a non-magnetic material, such as a stainless steel or aluminum. Disposed on the surface of shaft 12 is a magnetostrictive material 14. The magnetostrictive material is coated on or applied to the shaft in a manner that will produce a flux signal when the torque is applied to the shaft. The same signal is collected by the integrating fluxgate for measuring the torque applied to the shaft. An example of the magnetostrictive material is of the type disclosed in U.S. Pat. No. 6,645,039, the contents of which are incorporated herein by reference thereto. Of course, other types of magnetostrictive materials are contemplated to be used in accordance with the present disclosure.

The magnetostrictive material is magnetically polarized to have a circumferential moment in the direction of arrow 16. Of course, the magnetostrictive material may be magnetically polarized in a direction opposite of arrow 16. Upon receipt of an applied torque (arrow 18) a longitudinal magnetic flux (arrow 20) or torque flux leaves the magnetostrictive material. This flux is proportional to the torque that will be picked up by the device and method of the present disclosure.

Torque 18 is shown as being in a clockwise direction looking at the visible end of shaft 12, but obviously can be applied to rotate the shaft in either or both directions depending on the nature of the machine incorporating shaft 12.

Figure 2:
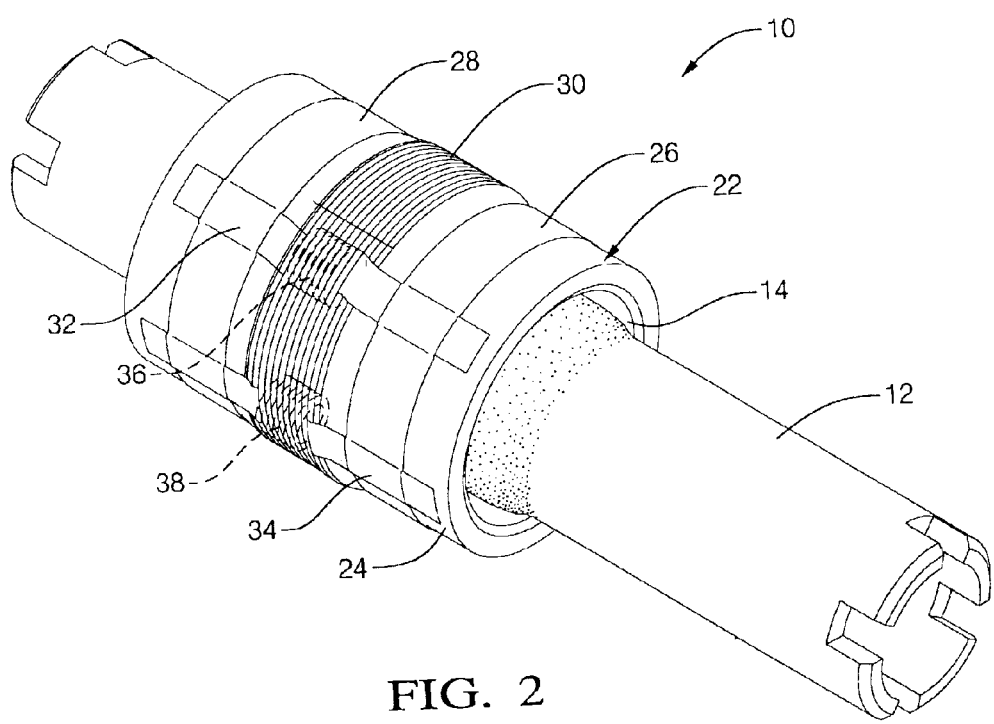
FIG. 2 is a perspective view of an integrating flux gate of the present disclosure disposed about a shaft having a magnetostrictive material.
Figure 3:
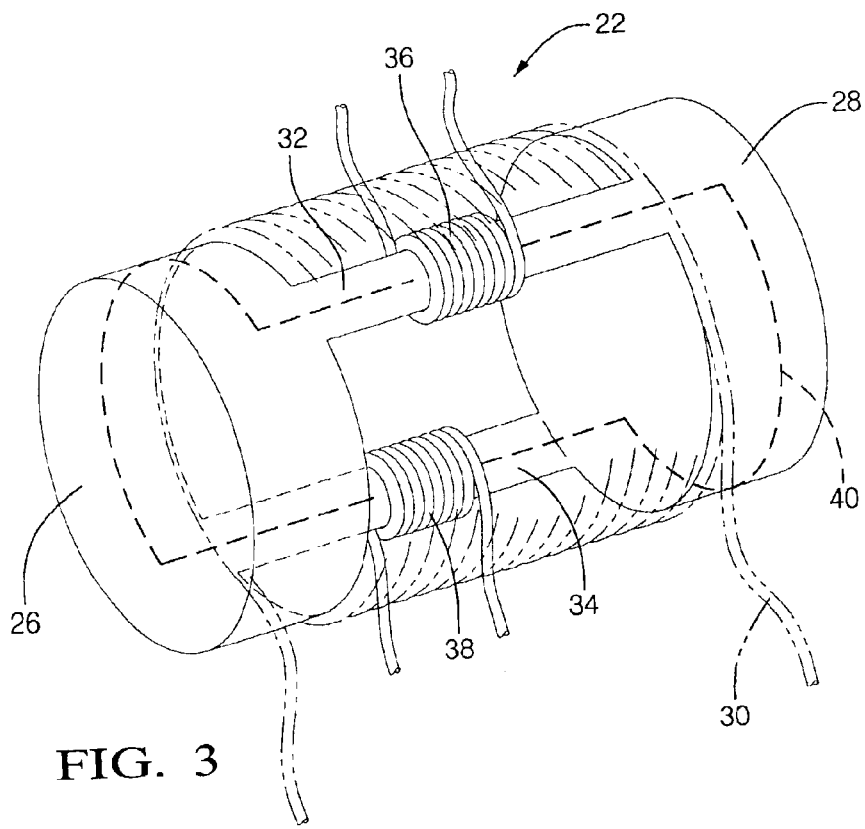
FIG. 3 is a perspective schematic view of an integrating flux gate of the present disclosure.

Referring now in particular to FIGS. 2 and 3 an integrating fluxgate 22 is disposed about magnetostrictive material 14. As will be described herein integrating fluxgate 22 is adapted to measure the torque flux of shaft 12. Integrating fluxgate 22 is mounted on a cylindrical member 24. Member 24 is constructed of a non-conductive material such as plastic, nylon or polymer of equivalent properties, which is lightweight and easily molded or manufactured. Member 24 is configured to allow shaft and magnetostrictive material 14 to be rotatably received therein. In addition, member 24 is secured to a structure (not shown) that is stationary with respect to rotating shaft member 12 accordingly; shaft member 12 is capable of rotation within member 24. In addition, and in order to prevent the device of the present application from being affected by external magnetic fields (e.g., the Earth's magnetic field) the entire device will be received with a shield capable of protecting the torque sensing apparatus for being adversely affected by such magnetic fields.

Disposed on member 24 is a first integrating ring 26 and a second integrating ring 28. Integrating rings 26 and 28 are constructed out of a high-permeable material such metalglass or permalloy of mumetal, or other materials having equivalent characteristics. As will be discussed herein the configuration of integrating rings 26 and 28 allow integrating fluxgate 22 to pick up torque flux signals anywhere along the periphery of magnetostrictive material 14. The torque flux signals are sensed by the integrating flux gate using a variety of coil configurations. In one embodiment, a three-coil configuration (C excitation, C pickup and C feedback) is used, in another embodiment a three-coil configuration is used (C excitation (C1 and C2 connected in series) and C feedback), is used, in yet another embodiment a two-coil configuration is used (C excitation and C feedback), in still another embodiment a single-coil configuration is used (wherein the coil is used as C excitation and C feedback) and in still another embodiment a five-coil configuration is used (C excitation (C1 and C2 connected in series), C pickup (C3 and C4 connected in series) and C feedback). These configurations and schemes for measuring torque using the fluxgate will be discussed herein.

Referring now to FIG. 3 an integrating fluxgate with a three-coil arrangement is illustrated. Here a feedback coil 30 (Cfb) is disposed about the other two coils. Disposed between integrating rings 26 and 28 is a first fluxgate return strip 32 and a second fluxgate return strip 34 as shown in FIG. 3. First fluxgate return strip 32 and second fluxgate return strip 34 are constructed out of the same material as the integrating rings.

A first flux gate winding 36 (C1) is wound about first fluxgate return strip 32 and a second flux gate winding 38 (C2) is wound about second fluxgate return strip 34. As discussed above, and in one embodiment the integrating fluxgate of the present disclosure is able to measure the torque flux of the magnetostrictive material through the use of three coils, namely, C1, C2 and Cfb. In an exemplary embodiment coils C1 and C2 are connected in series and coil Cfb is disposed about coils C1 and C2. Thus, a device is created wherein the external magnetic field of the magnetostrictive material is measured. In particular, the external magnetic field is collected along the periphery of the ends of the magnetostrictive material through the use of integrating rings 26 and 28.

Figure 8:
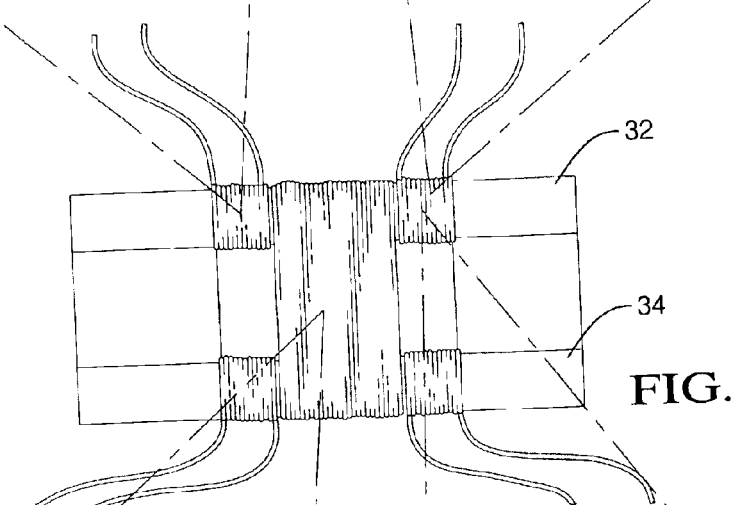
FIG. 8 illustrates an integrating fluxgate with five coils (excitation C1, C2, connected in series; pickup C3, C4, connected in series; and Cfb)

However, it is noted that the integrating fluxgate can measure the torque flux through the use of a five coil arrangement, shown in FIG. 8, comprising of coils C1, C2, C3, C4 and Cfb. The excitation coils (C1 and C2) are connected in series while the pick-up coils (C3 and C4) are also connected in series. In addition, and in accordance with an exemplary embodiment of the present disclosure the number of coils used are reduced. For example, and in one embodiment three coils are used (C excitation, C pickup and C feedback), or in another three coil arrangement wherein the pickup coil is eliminated C excitation (coils C1 and C2 connected in series) and C feedback is used, in another embodiment two coils are used (C excitation and C feedback) and in yet another embodiment one coil is used for both excitation and feedback, in the later three embodiments the pickup coil is completely eliminated.

In the three-coil arrangement (C excitation, C pickup and C feedback), the induced voltage in the pickup coil contains the $2^{nd}$ harmonic component upon application of a torque to the shaft. This $2^{nd}$ harmonic voltage is extracted by a means of a lock-in amplifier and rectified and fed, as current, to the feedback coil via a voltage to current converter to nullify the $2^{nd}$ harmonic component. This $2^{nd}$ harmonic voltage is proportional to the torque to the shaft.

In an exemplary embodiment and as illustrated in FIG. 3, first flux gate winding 36 and second flux gate winding 38 are connected in series to provide an excitation flux and the integrating flux gate 22 (integrating rings 26 and 28 and fluxgate return strips 32 and 34) provides a low reluctance closed loop flux path 40 from first flux gate winding 36 to second flux gate winding 38.

As shown, the apparatus is disposed in a surrounding relationship with the shaft to sense the torque imposed on the shaft. In one exemplary embodiment, the shaft is a rotating shaft within a vehicle. For instance, the shaft can be an ABS shaft, engine shaft, or transmission shaft, although it is to be appreciated that the principles set forth herein apply equally to other vehicular and non-vehicular rotating shafts.

It is being understood that in the embodiment where the pickup coil is eliminated the first and the second flux gate windings are connected in series are excited by a high frequency sinusoidal voltage to generate magnetic flux. This would also be the case in the five-coil arrangement. The excitation voltage and the frequency are adjusted such that the passing flux through the two flux gate strips and integrating rings such does not cause saturation without torque flux. The excitation current and frequency are adjusted such that the flux gate material is just below the saturation limit of the flux gate core.

For illustration purposes flux density (B) can be determined through use of the following formula:

$$B = E \times 10^8 / 4Anf; \text{ wherein}$$

E=Input or Output Voltage, in volt (rms)
A=Cross Sectional Area, in $cm^2$
f=Switching frequency, in $H^z$
N=Number of Turns In addition, and for illustration purposes, the magnetization force or H can be determined through the following formula:

$$H = 0.4\pi NI/l; \text{ wherein}$$

N=No. of turns
I=Current in Amps
l=Magnetic Path Length in cm.

In addition, the second flux gate winding is configured to receive magnetic flux from the shaft. Thus, the apparatus of the present disclosure is capable of maintaining the flux gate material out of magnetic saturation wherein an applied torque will create a torque flux that will be picked up by the device. When the flux material is out of saturation (e.g., no torque applied and no torque flux measured) there is no $2^{nd}$ harmonic waveform (current or voltage). Thus, and in accordance with an exemplary embodiment of the present disclosure the device uses the $2^{nd}$ harmonic waveform (current or voltage) to provide a signal that is used to provide a nullifying current to the feedback coil. The skilled artisan will appreciate that the flux defines a flux path from the excitation coil to its respective pickup coil or in the embodiment wherein the pickup coil is removed the flux defines a flux path from the excitation coils connected in series.

As discussed above when shaft 12 is presented with an applied torque (arrow 18) a longitudinal magnetic flux leaves the coating of magnetostrictive material, the integrating fluxgate of the present disclosure provides this flux with a return path. The produced or excitation flux and torque flux, if existing, is picked up by integrating ring 26, passes through fluxgate return strips 32 and 34 and integrating ring 28 to the other side of the magnetostrictive material 14. The torque flux adds or subtracts to the excitation flux produced by C1 and C2 in a three-coil arrangement or C excitation in a three, two or single coil arrangement as discussed in the various embodiments of the present disclosure. The signals are then interpreted by the torque sensing apparatus of the various embodiments of the present disclosure in various ways so that the applied torque is capable of being measured.

Figure 4A:
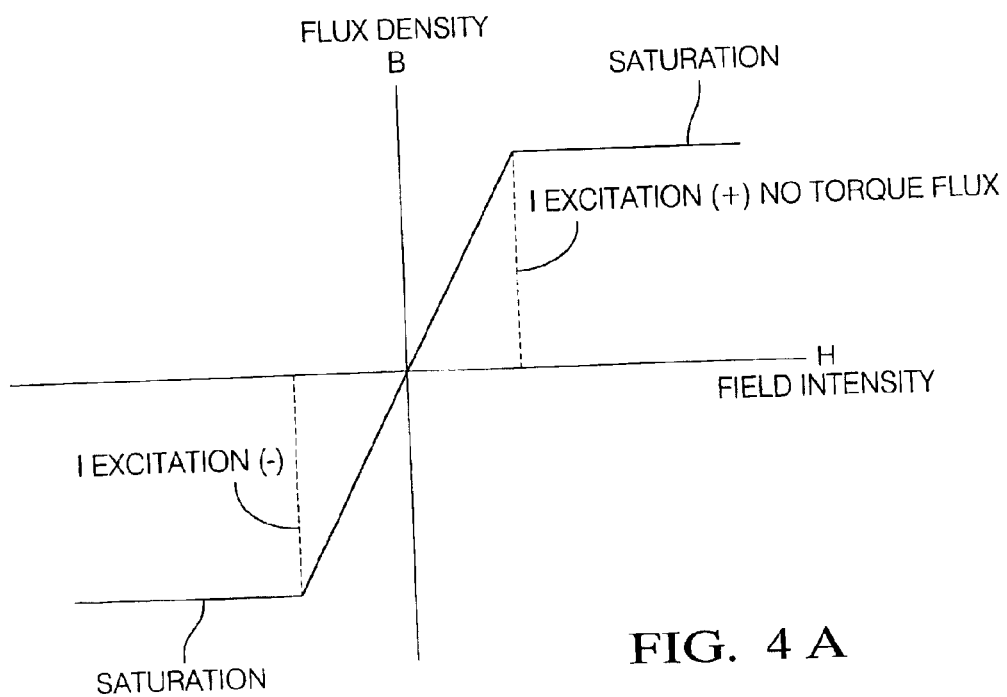
FIG. 4A is a graph of the BH curve of the integrating flux gate of the present disclosure with no torque.
Figure 4:
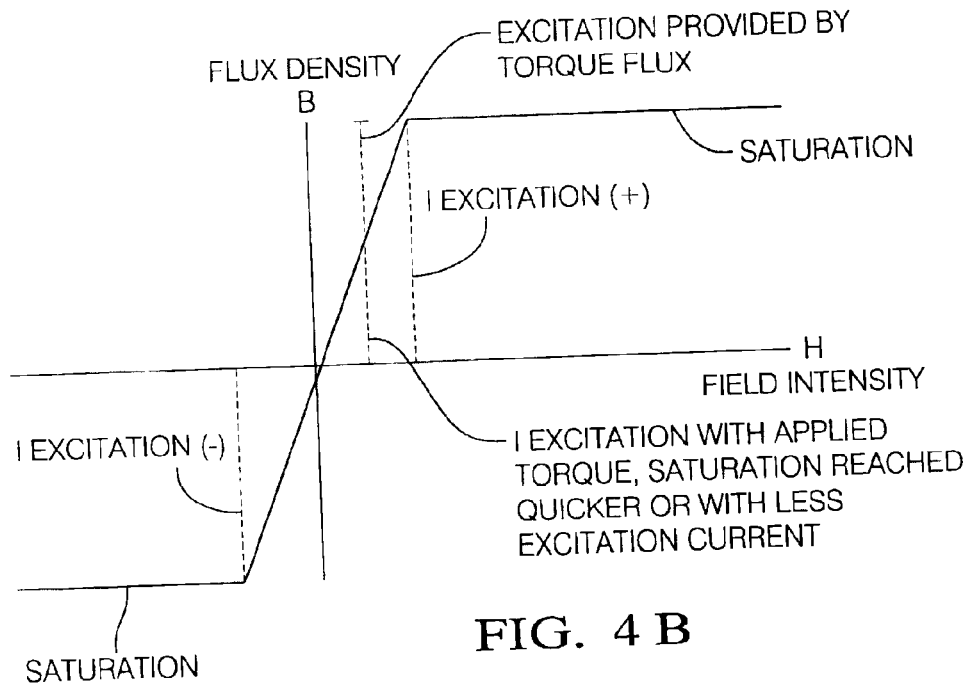
FIG. 4B is a graph of the BH curve of the integrating flux gate of the present disclosure with torque.
Figure 5:
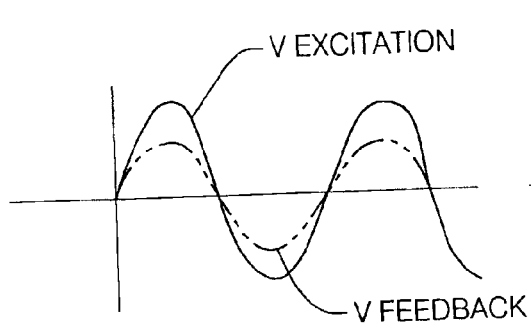
FIGS. 5 and 6 are graphs of illustrating the time dependence of the voltage across the excitation coil and the feedback coil for no applied torque and applied torque, respectively.
Figure 6:
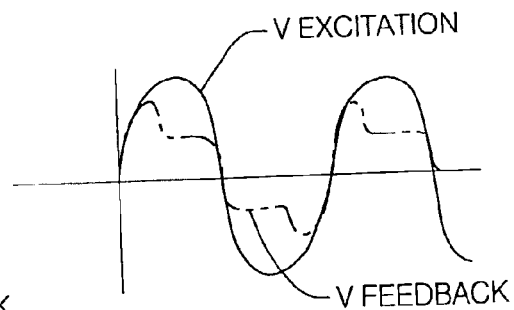
Figure 7:
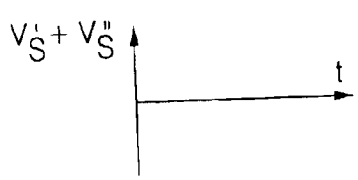
FIGS. 7A–7B are graphs illustrating the rectified second harmonic voltage signals as input to voltage to current converters feeding feedback coils.
Figure 7:
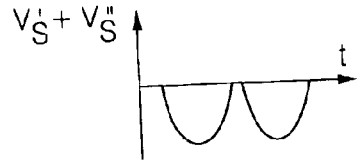

FIGS. 4–6 illustrate the principle operation of the fluxgate, of the present disclosure. FIGS. 4A and 4B illustrates a BH curve of the core material with and without torque. FIGS. 5 and 6 show the time dependence of the voltage across the excitation coils and feedback coil (with and without an applied flux or torque). FIGS. 7A and 7B are graphs which show the rectified $2^{nd}$ harmonic voltage of the pickup coil (e.g., a three coil arrangement C excitation, C pickup and C feedback) as an input to the feedback coil (with and without an applied torque flux).

Therefore, the passing of the torque flux through both return strips of the fluxgate causes early magnetic saturation in one direction and then in the other direction while the excitation frequency is sweeping the fluxgate core material in both directions.

This saturation causes $2^{nd}$ harmonic voltages in the feedback coil or pickup coil, depending on the embodiment being implemented as well as DC offset in the excitation current. Therefore, and in one embodiment, the applied torque is proportional to the rectified $2^{nd}$ harmonic voltage of the feedback coil or pickup coil, which is fed as current input to the feedback coil to nullify the core saturation. In another embodiment, the torque is proportional to the DC offset current in the excitation coil, which is fed as input to the feedback coil to nullify the core saturation caused by external torque flux.

In addition, and due to the circular configuration of integrating rings the flux gate is capable of integrating the magnetic flux about the entire periphery of the magnetostrictive material. Accordingly, the torque moment is measured about the entire periphery of the magnetostrictive material by integrating along the circumference at either end of the magnetostrictive material. This allows the integrating fluxgate of the present disclosure to measure the torque moment of the shaft regardless of angle at which the shaft is positioned. In addition and by integrating along the circumference at either end of the magnetostrictive material, the integrating fluxgate is self-correcting or is not susceptible to measurement anomalies associated with shaft wobble or irregularities in the surface of the shaft or magnetostrictive material disposed on the shaft. Thus, the integrating fluxgate of the present disclosure measures the torque leakage along the entire end of the magnetostrictive material.

The output waveforms of various embodiments of the integrating fluxgate of the present disclosure are shown in FIGS. 8–12. FIG. 8 illustrates an integrating fluxgate constructed with five coils (C1, C2, C3, C4, and Cfb) where the excitation coils C1 and C2 are connected in series and the pickup coils C3 and C4 are connected in series. However, as discussed above and as will be shown herein only three coils (C1, C2 and Cfb) or less are necessary to measure the applied torque in accordance with the various embodiments of the present disclosure as the pickup coil and others can be removed while still providing a device for measuring and nullifying torque flux.

Figure 9:
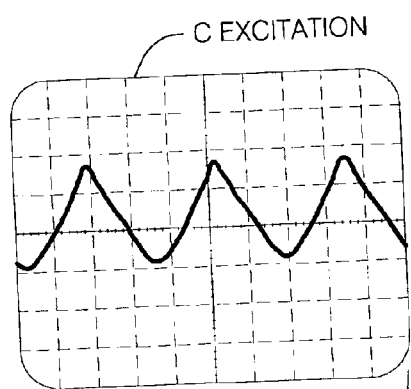
FIG. 9 shows the measured current waveform when a sinusoidal voltage is applied to the excitation coil (C1) in the presence of a torque flux.

When a sinusoidal voltage is applied to the excitation coil (C1 or C1 and C2 connected in series) and the current waveform is measured in the presence of a torque flux, FIG. 9 shows that the current waveform has a distortion that consists of a second harmonic signal and asymmetry with respect to the x-axis. Accordingly, the integrating fluxgate of the present disclosure can use the following properties to diagnose the presence of a torque flux: the second harmonic voltage, or a non-zero D.C. value of the time-averaged integral of the excitation current.

Figure 10:
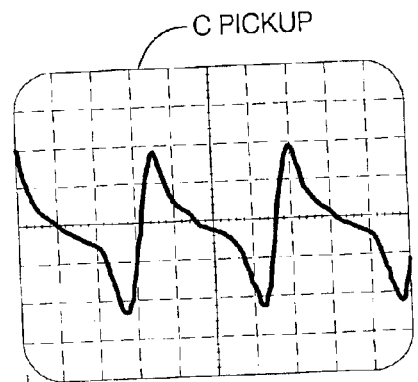
FIG. 10 illustrates the voltage measured across pick up coil (C3) under the same excitation as illustrated in FIG. 9 and in the presence of a torque flux.
Figure 11:
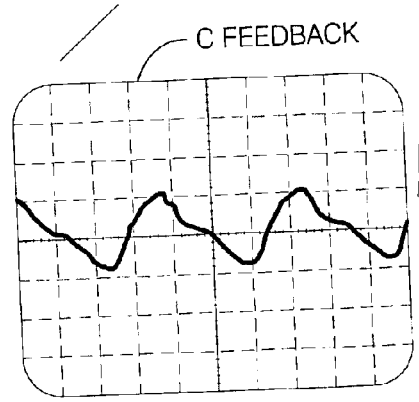
FIG. 11 illustrates the voltage measured across feedback coil (Cfb) under the same excitation as illustrated in FIG. 9 and in the presence of no torque flux.

Referring now to FIGS. 10 and 11 and under the same excitation as illustrated in FIG. 9, the voltage is measured across the pick up coil (C2). As illustrated, a second harmonic signal is also seen when a torque flux is present (FIG. 10) and disappears when the torque flux is zero. Accordingly, the voltage of pick up coil (C2) can also be used to diagnose the presence of a torque flux.

Figure 12:
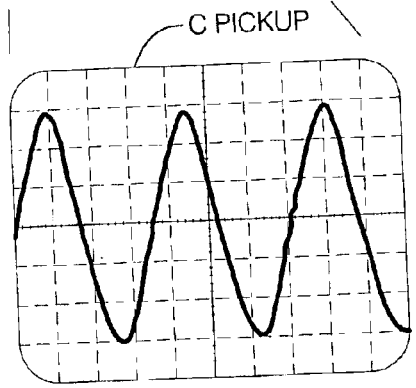
FIG. 12 illustrates the voltage measured across pickup coil (C3) under the same excitation as illustrated in FIG. 9 and in the presence of no torque flux.

Referring now to FIG. 12 and under the same excitation, the waveform of the voltage on the feedback coil (Cfb) is also shown. This waveform also has a strong second harmonic signal. If the structure had been perfect, and the two fluxgate strips absolutely symmetric, no contribution of the fundamental waveform would have been measured on the feedback coil (Cfb). Therefore, the feedback coil can also use the second harmonic signal as a diagnostic of the torque flux.

During operation of the integrating fluxgate of the present disclosure and regardless of how many coils are used or implemented a D.C. current is sent into the feedback coil to counterbalance the torque flux. To accomplish this a feedback loop (FIGS. 13, 14, 17 and 18) is required and accordingly, a D.C. current is sent into the feedback coil, such that either the second harmonic contribution on the feedback coil (Cfb) or the DC offset current in the excitation coil are nul, or in other words the integral of the current waveform into excitation coil is zero or nul, This feedback ensures that the entire structure is out of magnetic saturation. This DC current fed back to the feedback coil nullifies the saturation due to torque flux since it is proportional to the applied shaft torque.

A signal relating to the DC current sent to the feedback coil is also sent to a microprocessor, controller or equivalent means having a look up table or other means for determining the applied torque, which is used in any vehicular or other control system requiring torque readings.

Figure 13:
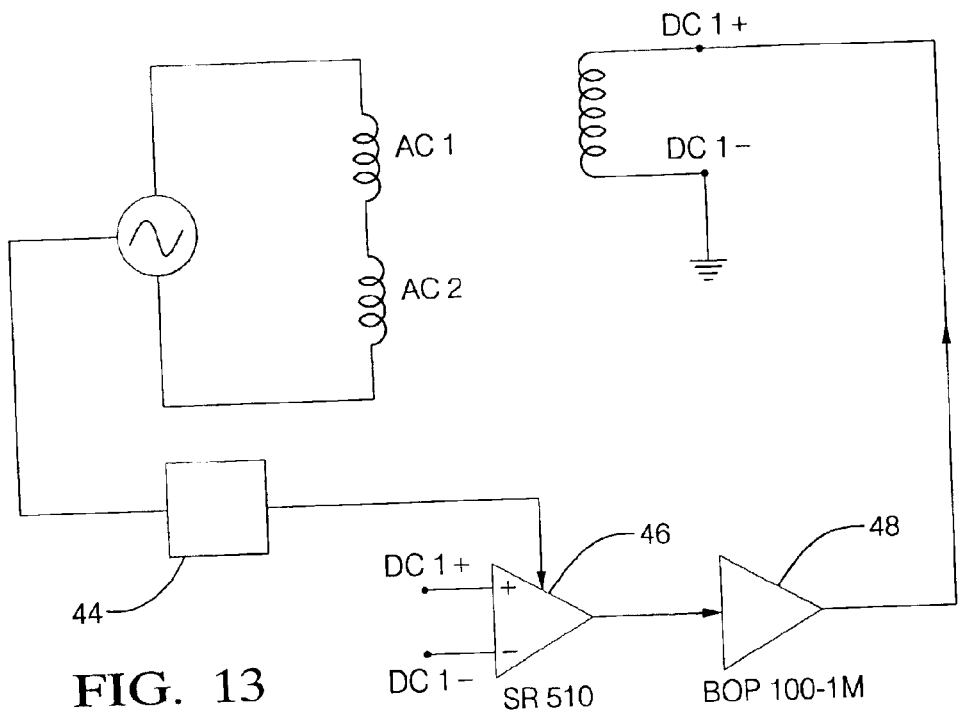
FIG. 13 is a schematic illustration of an exemplary circuit for use with the integrating flux gate of the present disclosure.

FIG. 13 illustrates an embodiment of a three coil (excitation coils AC1, AC2 connected in series and a feedback coil DC1) flux gate torque sensing circuit for determining the amount of torque being applied to the shaft by looking at the rectified second harmonic voltage of the voltage waveform of the feedback coil (DC1). In this embodiment AC1 is wound about one of the flux gate strips and AC2 is wound about the other while the feedback coil DC1 is wound about the two excitation coils AC1 and AC2.

The circuit is contemplated for use with an integrating flux gate as illustrated in FIGS. 2 and 3. The integrating flux gate comprises two integrating rings, two flux strips, two coils (AC1 or C1) and (AC2 or C2) connected in series and the feedback coil (DC1 or Cfb). In this embodiment AC1 comprises 50 turns of 32 gage wire and AC2 comprises 50 turns of 32 gage wire while the feedback coil DC1 comprises 72 turns of 25 gage wire. Of course, and as applications require the gage of the wire and number of turns may vary. In the illustrated embodiment, an AC voltage of 1.8 volts at a frequency of 49 kilohertz is applied to the excitation coils (AC1 and AC2, connected in series). In addition, this voltage is also applied to a frequency doubler 44 that doubles the frequency and applies a 98 kilohertz frequency as a reference input into a lock-in amplifier 46, which is used as a bandpass filter. Accordingly, only voltages at the reference frequency (98 khz, i.e. double the excitation frequency) will be picked up. Of course, and as applications require the frequency and the magnitude of excitation voltage may vary depending on the design of the flux gate.

The feedback coil voltage is passed through the lock-in amplifier to extract the rectified second harmonic voltage signal, which is then inputted into a voltage to current converter 48. This converted voltage is then inputted as DC current in the feedback coil DC1 to nullify the flux gate core saturation caused by the torque flux. The rectified $2^{nd}$ harmonic voltage is proportional to the applied shaft torque.

In this embodiment the integrating fluxgate is measuring the applied torque by using a null detection scheme wherein the fluxgate is measuring the applied torque by picking up the $2^{nd}$ harmonic rectified DC voltage of the feedback coil, converting it into a current, and feeding into the feedback coil to nullify the core saturation due to torque flux.

Figure 14:
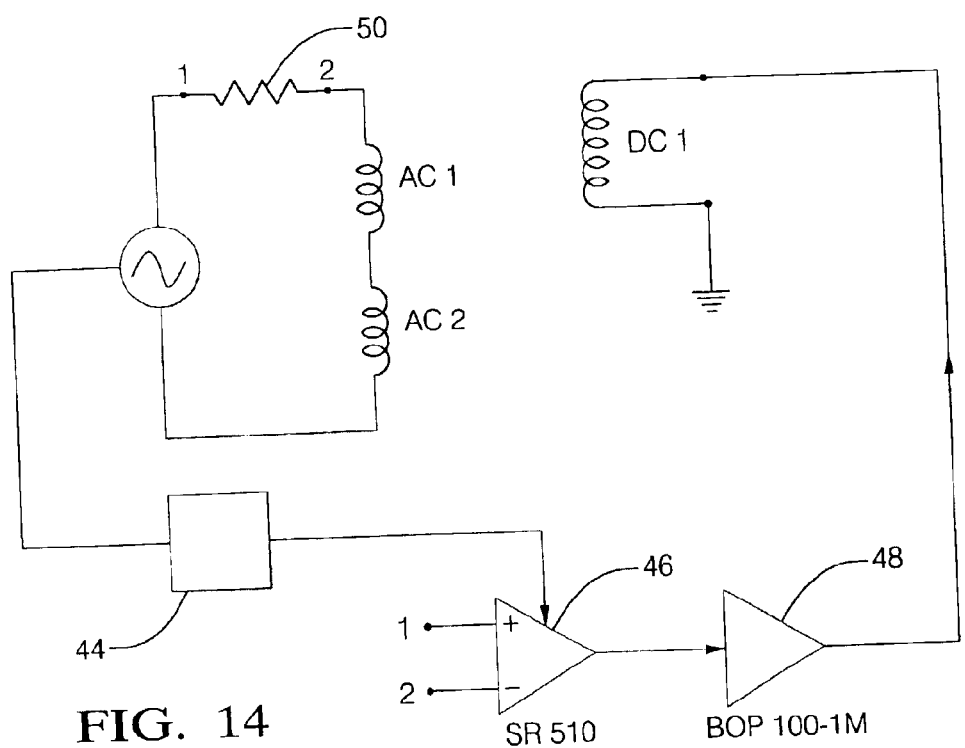
FIG. 14 is a schematic illustration of an alternative exemplary circuit for use with the integrating flux gate of the present disclosure.

Referring now to FIG. 14, an alternative circuit for determining the amount of torque that is being applied to the shaft in a three coil (C1, C2, Cfb) flux gate torque sensor circuit by looking at the second harmonic of the current waveform of the excitation coil (C1 and C2 connected in series). The circuit is contemplated for use with an integrating flux gate as illustrated in FIGS. 2 and 3. The integrating flux gate comprises two integrating rings, two flux strips, two coils (AC1 or C1) and (AC2 or C2) connected in series and the feedback coil (DC1 or Cfb). In this embodiment AC1 comprises 50 turns of 32 gage wire and AC2 comprises 50 turns of 32 gage wire while the feedback coil DC1 comprises 72 turns of 25 gage wire. Of course, and as applications require the gage of the wire and number of turns may vary. In the illustrated embodiment, an AC voltage of 1.8 volts at a frequency of 49 kilohertz is applied to the coils AC1 and AC2.

The excitation frequency is also applied to a frequency doubler 44 that doubles the frequency (98 kilohertz) and used as a reference frequency signal to the lock-in amplifier 46. This lock-in amplifier takes the voltage proportional to the excitation current across the shunt 50 as input, shown in FIG. 14, and extracts the $2^{nd}$ harmonic content. It also rectifies and filters the $2^{nd}$ harmonic voltage and provides a DC voltage signal to the voltage to current converter.

In an exemplary embodiment, resistor 50 has a value in the range of 10–100 ohms; of course, other values greater or less than the aforementioned range are contemplated for use with the present disclosure.

As illustrated, only currents at the reference frequency, double the excitation frequency (98 khz) will be picked up. Of course, and as applications require the frequency and magnitude of the excitation voltage may vary to values greater or less than 49 khz and 1.8 volts respectively. The measured voltage across the resistor, which is proportional to the current in the resistor, is fed into the lock-in amplifier, the DC output voltage signal of the lock-in amplifier is fed to the feedback coil through a voltage to current converter wherein the current applied to the feedback coil nullifies core saturation caused by the torque flux. The output of DC voltage of the lockin amplifier is proportional to the applied shaft torque.

In this embodiment the integrating fluxgate is measuring the applied torque by using a null detection scheme wherein the fluxgate is measuring the applied torque by picking up the $2^{nd}$ harmonic current in the excitation coil (C1) and drive it to zero by feeding the current into the feedback coil to nullify the core saturation caused by the torque flux.

Figure 15:
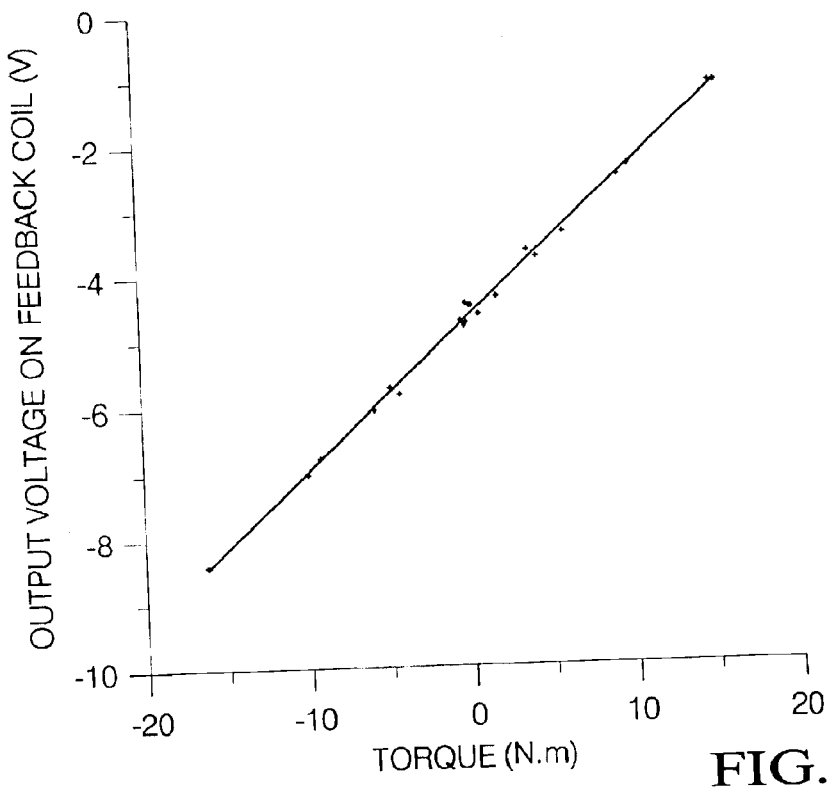
FIG. 15 is a graph illustrating a plot of the output voltage on the feedback coil (Cfb) versus an applied torque.
Figure 16:
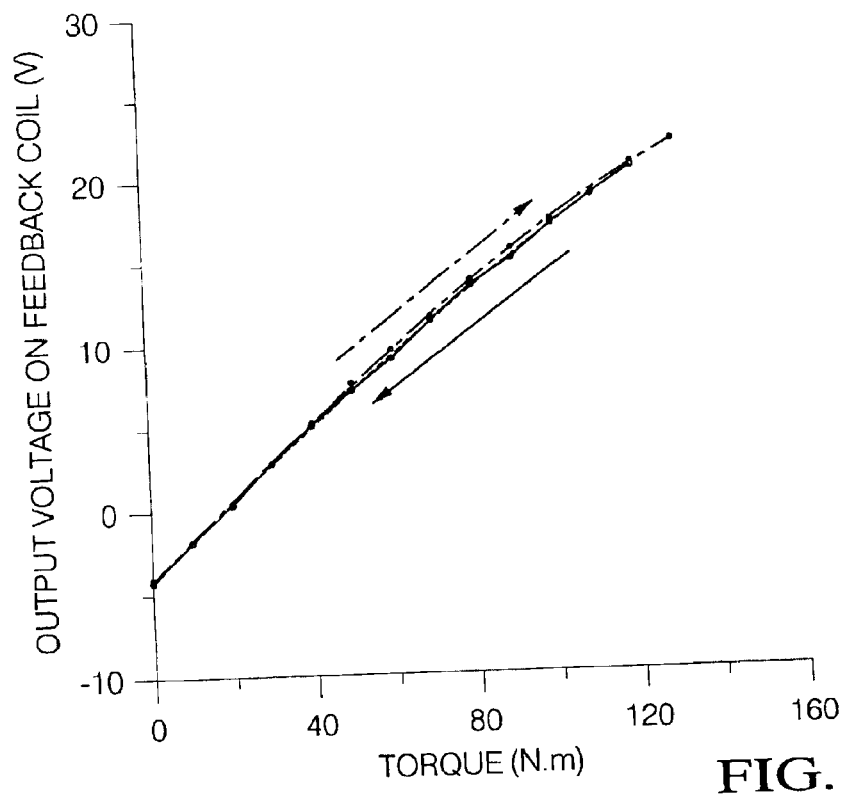
FIG. 16 is another graph illustrating a plot of the output voltage on the feedback coil (Cfb) versus an applied torque in an ascending and descending torque direction.

FIG. 15 is a graph illustrating a plot of the output voltage on the feedback coil (Cfb) versus an applied torque and FIG. 16 is another graph illustrating a plot of the output voltage on the feedback coil (Cfb) versus an applied torque.

Figure 17:
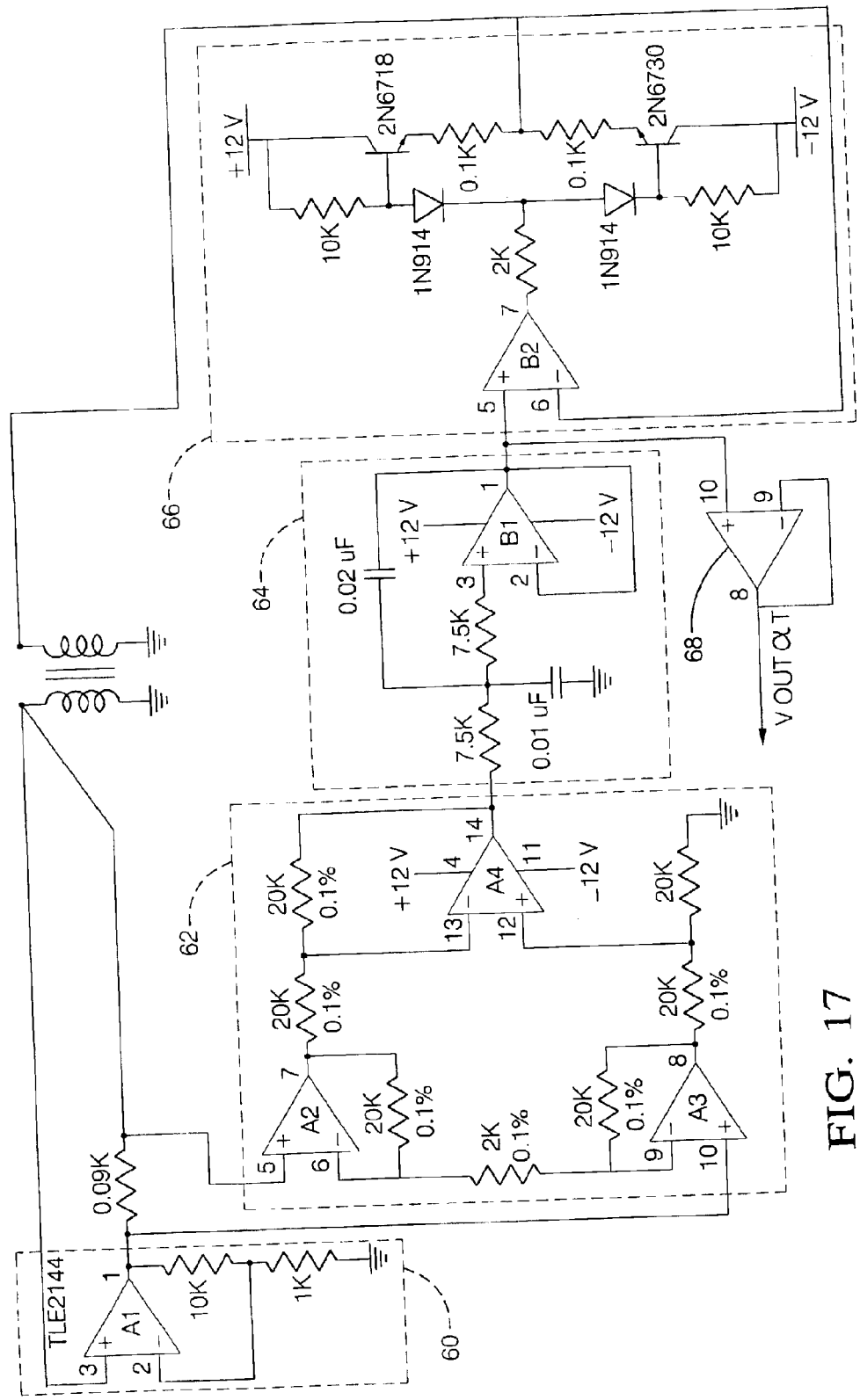
FIG. 17 is a schematic illustration of another alternative exemplary circuit for use with the integrating flux gate of the present disclosure.

FIG. 17 is a schematic illustration of an alternative embodiment of the present disclosure wherein a two coil (excitation and feedback) torque sensor circuit is used to measure the applied torque. In this embodiment a single coil is used to provide the excitation flux and receive the torque flux through the integrating rings and flux gate return strips of the present disclosure. The circuit of this embodiment comprises an oscillator 60 it can be square wave or sine wave or any periodic function of time, a differential amplifier 62, a second order filter 64, a voltage controlled current source 66, and an output amplifier 68.

In this embodiment the flux strips of the closed loop reluctance path are maintained just below the magnetic saturation point when only excitation current flows through the single excitation coil (with no torque flux). When an applied torque is encounter or applied to the shaft the flux strips are magnetically saturated in one direction then in the other direction when the excitation frequency is sweeping the core in both positive and negative directions. The saturation causes DC offset in the excitation waveform, the voltage proportional to the excitation current obtained by measuring the voltage across the series resistor connected in the excitation coil is fed to the differential amplifier 62. The output of the differential amplifier 62 is fed to second order active filter 64 to extract DC voltage proportional to the offset DC current in the excitation coil. The voltage is fed to the voltage to current converter (voltage control current source 66) and fed back to the feedback coil to nullify the flux gate core saturation due to torque flux.

Figure 18:
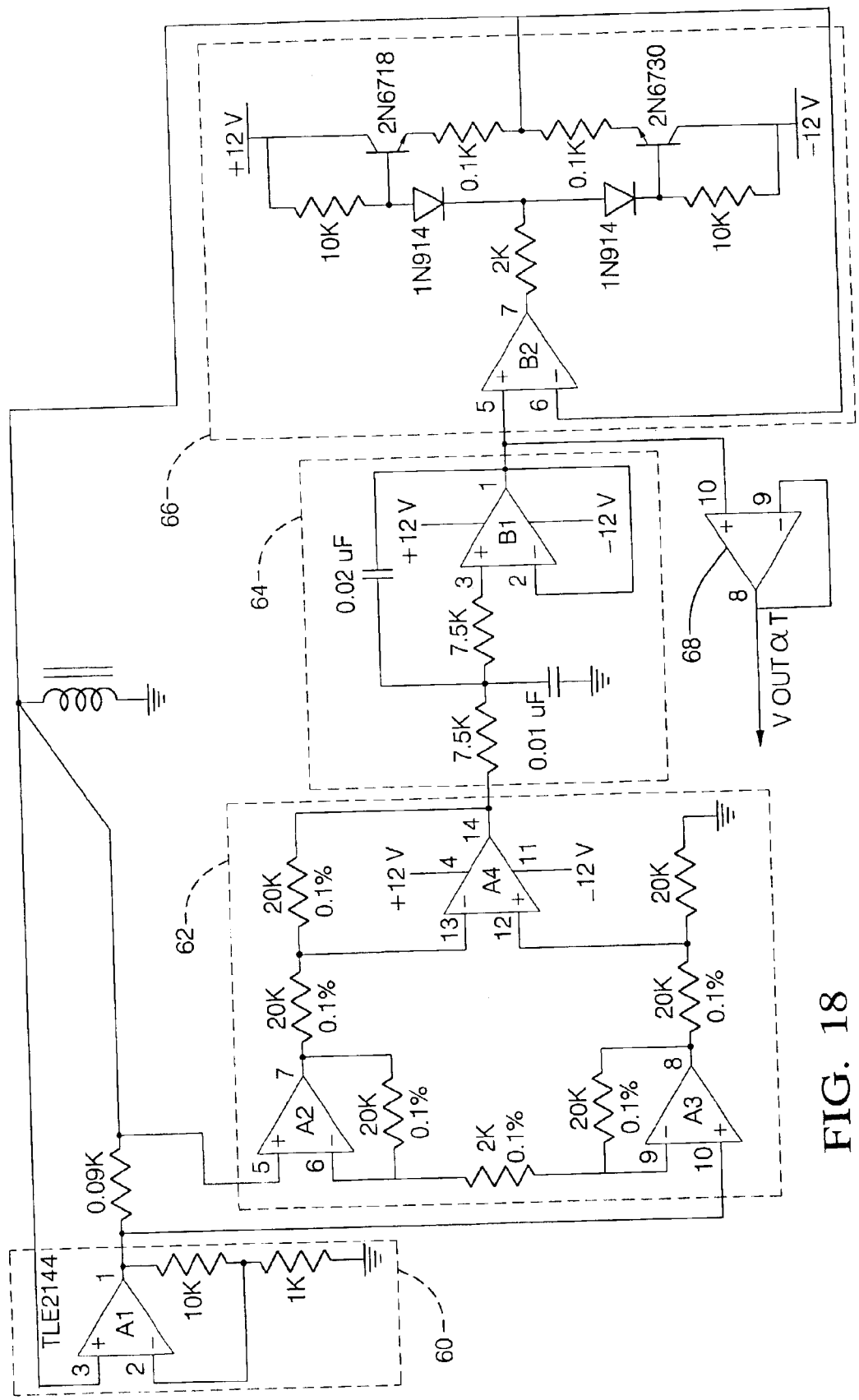
FIG. 18 is a schematic illustration of yet another alternative alternative exemplary circuit for use with the integrating flux gate of the present disclosure.

FIG. 18 is a schematic illustration of another alternative exemplary circuit for use with the integrating flux gate of the present disclosure. Here a single coil is used as both the excitation and feedback coil. In this embodiment the flux strips of the closed loop reluctance path are maintained just below their magnetic saturation point when the excitation current is flowing through the coil. When an applied torque is encountered or applied to the shaft the flux strips are magnetically saturated in one direction then in the other direction when the excitation frequency is sweeping the core in both positive and negative directions. The saturation causes DC offset in the excitation waveform, the voltage proportional to the excitation current obtained by measuring the voltage across the series resistor connected in the coil is fed to the differential amplifier 62. The output of the differential amplifier 62 is fed to second order active filter 64 to extract DC voltage proportional to the offset DC current in the coil. The voltage is fed to the voltage to current converter (voltage control current source 66) and fed back to the coil to nullify the flux gate core saturation due to torque flux.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A torque sensing apparatus for picking up a magnetic field of a magnetostrictive material disposed on a shaft, comprising:
   a first integrating ring;
   a second integrating ring;
   a first fluxgate return strip and a second fluxgate return strip each being connected to said first integrating ring at one end and said second integrating ring at the other end;
   an excitation coil; and
   a feedback coil wound about said excitation coil.

2. The torque sensing apparatus as in claim 1, wherein said first integrating ring, said second integrating ring, said first fluxgate return strip and said second fluxgate return strip are constructed out of a high-permeable material.

3. The torque sensing apparatus as in claim 1, wherein said first integrating ring and said second integrating ring are configured to pick up magnetic flux along the periphery of the magnetostrictive material.

4. The torque sensing apparatus as in claim 3, wherein said excitation coil comprises a first coil and a second coil, said first coil being wound about said first fluxgate return strip and said second coil being wound about said second fluxgate return strip and said first and said second coil are connected in series.

5. The torque sensing apparatus as in claim 4, wherein said first integrating ring, said second integrating ring, said first fluxgate return strip and said second fluxgate return strip are constructed out of a high-permeable material and are disposed on a cylindrical member being configured to allow said shaft to be rotatably received therein.

6. The torque sensing apparatus as in claim 3, wherein said excitation coil comprises a first coil and a second coil, said first coil being wound about said first fluxgate return strip and said second coil being wound about said second fluxgate return strip and said first and said second coil are connected in series to provide a measurement flux and said first integrating ring, said second integrating ring, said first fluxgate return strip and said second fluxgate return strip provide a low reluctance closed loop flux path.

7. The torque sensing apparatus as in claim 6, wherein said first integrating ring and said second integrating ring are configured to be positioned to pick up flux signals along the entire periphery of the ends of the magnetostrictive material.

8. The torque sensing apparatus as in claim 1, wherein said first integrating ring, said second integrating ring, said first fluxgate return strip and said second fluxgate return strip are constructed out of a high-permeable material and said first integrating ring and said second integrating ring are configured to pick up magnetic flux along the periphery of the magnetostrictive material and the torque sensing apparatus further comprises a pickup coil.

9. The torque sensing apparatus as in claim 8, wherein the application of a torque to the shaft will provide an induced voltage in the pickup coil, the induced voltage contains a $2^{nd}$ harmonic component which is extracted by a means of a lock-in amplifier and rectified and fed, as current, to the feedback coil via a voltage to current converter to nullify the $2^{nd}$ harmonic component, wherein the $2^{nd}$ harmonic voltage is proportional to the torque to the shaft.

10. A torque sensing apparatus adapted for use with a magnetostrictive material disposed on a shaft, comprising:
a first integrating ring;
a second integrating ring;
a first fluxgate return strip and a second fluxgate return strip each being connected to said first integrating ring at one end and said second integrating ring at the other end to create a closed loop reluctance path;
an excitation coil;
a feedback coil; wherein said first fluxgate return strip and said second fluxgate return strip of the closed loop reluctance path are maintained just below a magnetic saturation point when only an excitation current flows through said excitation coil and the fluxgate return strips are magnetically saturated in one direction then in the other direction when an applied torque is encountered by the shaft, the magnetic saturation causes a DC offset in an excitation waveform of the excitation coil and the DC offset is used to provide a proportional current to the feedback coil to nullify the magnetic saturation of the fluxgates.

11. The torque sensing apparatus as in claim 1, further comprising a detection circuit for determining the torque applied to the shaft, said detection circuit comprises:
a voltage source for applying a voltage to said excitation coil at a first frequency;
a frequency doubler for doubling said first frequency to a second frequency;
a lock-in amplifier for receiving signals related to the second harmonic voltage waveform on said feedback coil and a reference signal from said frequency doubler, said lock-in amplifier producing an output signal relating to the voltage sensed across said feedback coil; and
a voltage to current converter configured to receive said output signal and convert it to a current wherein the current in the feedback loop is driven to balance the flux that is applied to said first fluxgate return strip and said second fluxgate return strip.

12. The torque sensing apparatus as in claim 1, further comprising a detection circuit for measuring the second harmonic current waveform on said excitation coil, said detection circuit comprises:
a voltage source for applying a voltage to said excitation coil and at a first frequency;
a frequency doubler for doubling said first frequency to a second frequency;
a lock-in amplifier for receiving signals related to the second harmonic current waveform on said excitation coil and a reference signal from said frequency doubler, said lock-in amplifier producing an output signal relating to the second harmonic current in the excitation coil and said lock-in amplifier provides a signal corresponding to the second harmonic current in said excitation coil, said signal being inputted into said feedback coil in the form of an applied current;
wherein the applied current in the feedback coil is driven to balance the flux that is applied to said first fluxgate return strip and said second fluxgate return strip.

13. The torque sensing apparatus as in claim 12, wherein said excitation coil comprises a first coil and a second coil, said first coil being wound about said first fluxgate return strip and said second coil being wound about said second fluxgate return strip and said first and said second coil are connected in series to provide a measurement flux and said first integrating ring, said second integrating ring, said first fluxgate return strip and said second fluxgate return strip provide a low reluctance closed loop flux path.

14. A method for determining the applied torque to a shaft, comprising:
integrating a first end of a magnetostrictive material disposed on the shaft with a first integrating ring;
integrating a second end of said magnetostrictive material disposed on the shaft with a second integrating ring;
providing a measurement flux in a first flux gate winding and a second flux gate winding, each being disposed about said magnetostrictive material;
providing a low reluctance closed loop flux path from said first flux gate winding to said second flux gate winding by connecting a first flux gate return strip to said first integrating ring at one end and said second integrating ring at the other end and by connecting a second flux gate return strip to said first integrating ring at one end and said second integrating ring at the other end; and
measuring an applied torque to the shaft by using a null detection scheme on said a low reluctance closed loop flux path.

15. A torque sensing apparatus for picking up a magnetic field of a magnetostrictive material disposed on a shaft, comprising:
a first integrating ring;
a second integrating ring;
a first fluxgate return strip and a second fluxgate return strip each being connected to said first integrating ring at one end and said second integrating ring at the other end;
a means for providing a magnetic flux wherein said first fluxgate return strip and said second fluxgate return strip are maintained just below a point of magnetic saturation; and
a means for determining an applied torque to the shaft.

16. The torque sensing apparatus as in claim 15, wherein the applied torque causes said first fluxgate return strip and said second fluxgate return strip to become magnetically saturated.

17. The torque sensing apparatus as in claim 16, further comprising means for maintaining said first fluxgate return strip and said second fluxgate just below a point of magnetic saturation after a torque has been applied and sensed by said means for determining the applied torque to the shaft.

18. The torque sensing apparatus as in claim 15, further comprising means for maintaining said first fluxgate return strip and said second fluxgate just below a point of magnetic saturation after a torque has been applied and sensed by said means for determining the applied torque to the shaft.

19. The torque sensing apparatus as in claim 7, wherein said first fluxgate return strip and said second fluxgate return strip are maintained just below a point of magnetic saturation when there is no torque applied to the shaft.

20. The torque sensing apparatus as in claim 3, wherein an applied torque to the shaft causes said first fluxgate return strip and said second fluxgate to become magnetically saturated.

21. The torque sensing apparatus as in claim 19, wherein an applied torque to the shaft causes either said first fluxgate return strip or said second fluxgate to become magnetically saturated early in one direction and then in the other direction an excitation frequency of the excitation coil is sweeping the fluxgate in both directions.

22. A torque sensing apparatus adapted for use with a magnetostrictive material disposed on a shaft, comprising:

a first integrating ring;

a second integrating ring;

a first fluxgate return strip and a second fluxgate return strip each being connected to said first integrating ring at one end and said second integrating ring at the other end to create a closed loop reluctance path;

an excitation coil;

a feedback coil; wherein said first fluxgate return strip and said second fluxgate return strip of the closed loop reluctance path are maintained just below a magnetic saturation point when only an excitation current flows through said excitation coil and the fluxgate return strips are magnetically saturated in one direction then in the other direction when an applied torque is encountered by the shaft, the magnetic saturation causes a DC offset in an excitation waveform of the excitation coil and the DC offset is used to provide a proportional current to the feedback coil to nullify the magnetic saturation of the fluxgates;

wherein the excitation coil is used to provide an excitation flux and receive the torque flux through the first integrating ring, the second integrating ring, the first fluxgate return strip and the second fluxgate return strip.

23. The torque sensing apparatus as in claim 22, further comprising a torque detection circuit comprising: an oscillator; a differential amplifier; a second order filter, a voltage controlled current source, and an output amplifier.

24. A torque sensing apparatus adapted for use with a magnetostrictive material disposed on a shaft, comprising:

a first integrating ring;

a second integrating ring;

a first fluxgate return strip and a second fluxgate return strip each being connected to said first integrating ring at one end and said second integrating ring at the other end to create a closed loop reluctance path;

a coil;

wherein said first fluxgate return strip and said second fluxgate return strip of the closed loop reluctance path are maintained just below a magnetic saturation point when only an excitation current flows through said coil and the fluxgate return strips are magnetically saturated in one direction then in the other direction when an applied torque is encountered by the shaft, the magnetic saturation causes a DC offset in an excitation waveform of the coil and the DC offset is used to provide a proportional current to the coil to nullify the magnetic saturation of the fluxgates;

wherein the coil is used to provide an excitation flux and receive the torque flux through the first integrating ring, the second integrating ring, the first fluxgate return strip and the second fluxgate return strip.

25. The torque sensing apparatus as in claim 24, further comprising a torque detection circuit comprising: an oscillator; a differential amplifier; a second order filter, a voltage controlled current source, and an output amplifier.

\* \* \* \* \*